United States Patent [19]

Whinnery et al.

[11] Patent Number: 5,668,188
[45] Date of Patent: Sep. 16, 1997

[54] PROCESS FOR PREPARING SILICON CARBIDE FOAM

[75] Inventors: LeRoy Louis Whinnery; Monte Carl Nichols, both of Livermore, Calif.; David Roger Wheeler; Douglas Anson Loy, both of Albuquerque, N. Mex.

[73] Assignee: Sandia Corporation, Albuquerque, N. Mex.

[21] Appl. No.: 586,453

[22] Filed: Jan. 16, 1996

[51] Int. Cl.⁶ ........................... C08J 9/28
[52] U.S. Cl. ............... 423/345; 264/44; 264/51; 264/29.1; 264/29.7; 423/345; 423/445; 423/449; 501/88; 521/918; 521/64; 502/101; 502/180; 502/416; 502/418
[58] Field of Search ............ 521/64, 918; 423/345, 423/445; 264/44, 29.7, 51, 29.1; 501/88

[56] References Cited

U.S. PATENT DOCUMENTS

| | | | |
|---|---|---|---|
| 3,946,039 | 3/1976 | Walz | 264/332 |
| 4,159,259 | 6/1979 | Yajima et al. | 528/14 |
| 4,513,030 | 4/1985 | Milewski | 427/227 |
| 4,664,858 | 5/1987 | Kido et al. | 264/44 |
| 4,673,695 | 6/1987 | Aubert et al. | 521/64 |
| 4,743,662 | 5/1988 | Lipowitz | 525/474 |
| 4,767,831 | 8/1988 | Bartos et al. | 525/474 |
| 4,832,881 | 5/1989 | Arnold Jr, et al. | 264/29.7 |
| 5,154,970 | 10/1992 | Kaplan et al. | 428/304.4 |
| 5,248,462 | 9/1993 | Brotz | 264/42 |

OTHER PUBLICATIONS

West, David et al. American Ceramic Society Bulletin, vol. 26(8):pp. 899–903 (1983) "Polysilastyrene: Phenylmethylsilane-Dimethylsilane Copolymers as Precursors to Silicon Carbide".

Mazdiyasni, K.S. et al. American Ceramic Society Journal, vol. 61 (11–12): pp. 504–508 (1978) "Characterization of Organosilicon-Infiltrated Porous Reaction-Sintered Si3N4".

*Primary Examiner*—Morton Foelak
*Attorney, Agent, or Firm*—Kurt C. Olsen; Timothy D. Stanley; Donald A. Nissen

[57] ABSTRACT

A method of preparing near net shape, monolithic, porous SiC foams is disclosed. Organosilicon precursors are used to produce polymeric gels by thermally induced phase separation, wherein, a sufficiently concentrated solution of an organosilicon polymer is cooled below its solidification temperature to form a gel. Following solvent removal from the gel, the polymer foam is pretreated in an oxygen plasma in order to raise its glass transition temperature. The pretreated foam is then pyrolized in an inert atmosphere to form a SiC foam.

17 Claims, 4 Drawing Sheets

PROCESS FOR PREPARING SILICON CARBIDE FOAM

STATEMENT OF GOVERNMENT INTEREST

This invention was made with Government support under contract no. DE-AC04-94AL8500 awarded by the U.S. Department of Energy to Sandia Corporation. The Government has certain rights in the invention.

BACKGROUND OF THE INVENTION

This invention pertains generally to the preparation of silicon carbide foams and particularly to a method of preparing silicon carbide foams, having controlled structure and properties, from organosilicon polymers.

Because of its unique chemical and physical properties; extreme chemical inertness, the ability to withstand very high temperatures (>2000 C), very high hardness, low coefficient of thermal expansion, excellent thermal conductivity and semiconducting properties, silicon carbide (SiC) has found an important place as an industrial material. While it is these unique properties that make SiC such an attractive material for many applications, they also are drawbacks, particularly insofar as the ability to produce or employ this material in different forms.

Silicon carbide can be made by heating silicon dioxide and carbon or graphite to temperatures in excess of 1500 C. The SiC whiskers formed by this process are known to possess a very high strength to weight ratio and oxidative stability. It would be desirable to be able to employ these whiskers directly as a reinforcing material in ceramic or metal composites. However, because of the various mechanical processes required to incorporate these whiskers into composites they become severely damaged and lose most of the mechanical properties that make them desirable in the first place. This same process can be used to produce to produce monolithic SiC structures. However, it is very difficult to get uniform reaction.

In those instances where only a high temperature coating is required, a chemical vapor deposition method can be used to produce SiC. Generally, SiC is deposited by heating a mixture of gases, for example, dichloromethylsilane and hydrogen, to a temperature above 1200 C; although, as discussed in U.S. Pat. Nos. 4,159,259 and 4,513,030 other organosilicon compounds can be used. However, unless the SiC coating is very thin it is difficult to get it to adhere well to the substrate, particularly where there is a significant difference in the coefficient of thermal expansion between the substrate and the SiC coating.

Silicon carbide composites can also be used to fabricate porous structural materials. In such instance, organosilicon precursor materials are heated to temperatures above the appropriate glass transition temperature (Tg), the temperature at which the organosilicon precursor fuses or softens, to form a spinning melt and the molten material is spun into a fiber which is then pyrolized to form a SiC fiber or thread. This fiber or thread is subsequently spun into a fabric. Conventional lay-up methods are used to fabricate the structural material desired. Restricted fiber preform connectivity increases the time and cost of matrix deposition. The fact that the fiber fabrication and lay-up processes are complex causes this process to have extremely high processing costs.

Silicon carbide foams possess many desirable features, in particular high strength to weight ratios, consequently, they find wide utility as catalyst supports, high temperature filtering media, materials of construction and heat exchangers, among other things. However, these foams are particularly difficult to produce. For these reasons, significant effort has been put forth to fabricate them. As disclosed in U.S. Pat. No. 5,154,970, a open porosity substrate can serve as a skeleton to define the geometry of the structure. A SiC or other refractory coating is then chemical vapor deposited thereon. The substrate can then be burned or leached out, if desired, thereby forming a reticulated SiC structure. U.S. Pat. Nos. 3,946,039, 4,664,858 and 5,248,462 disclose investment casting type processes, and variations thereon, for preparing reticulated SiC or other refractory structures. However, none of these methods can provide the ability to tailor the internal structure (porosity) of the SiC foam and, in particular, they cannot be used to produce meso-porous SiC foams which for the purposes of the instant invention is defined as having pores which are about 10–100 μm in diameter. Infiltration methods as discussed, for example, in Mazdiyanski et al., J. American Ceramic Soc., 61, pp. 504–508, 1978, can be used for reducing porosity or pore volume but the process is very time consuming and it is difficult to achieve uniformity. All these methods of preparing SiC foams or porous materials suffer from the disadvantage that fabrication is difficult and/or time consuming and processing costs are high. What is desired therefore, is a method of preparing monolithic SiC foams that is simple, inexpensive and will produce foams that have controlled porosity and sufficient structural strength so that they are machineable and/or may be produced to near net shape.

The present invention provides a method of economically producing monolithic SiC foams, substantially free of large defects or voids, having controlled porosity and sufficient structural strength such that the SiC foams can be machined. The method disclosed herein further provides for producing near net shape SiC foam parts.

SUMMARY OF THE INVENTION

It has been discovered that SiC foams with superior properties can be prepared from organosilicon polymer foams. According to the instant invention, organosilicon precursor polymers, particularly polysilanes, can be used to a produce gels from which the solvent is extracted to form foams that, following a pretreatment step that serves to cross-link the foams, are subsequently pyrolized to form SiC. While polymer gels can be prepared by any of several methods known to those skilled in the art, the preferred method for preparing the organosilicone gels described herein is the use of thermally induced phase separations (TIPS) wherein a sufficiently concentrated solution of a polymer is cooled below its transition temperature to form a gel.

The present method for forming SiC foams provides novel features and advantages over existing methods for producing SiC foams which will become apparent to those skilled in the art from detailed disclosure of the present invention as set forth hereinbelow.

BRIEF DESCRIPTION OF THE DRAWINGS

The nature and purpose of the present invention is further described by reference to the accompanying drawings.

DETAILED DESCRIPTION OF THE INVENTION

Figure 1:
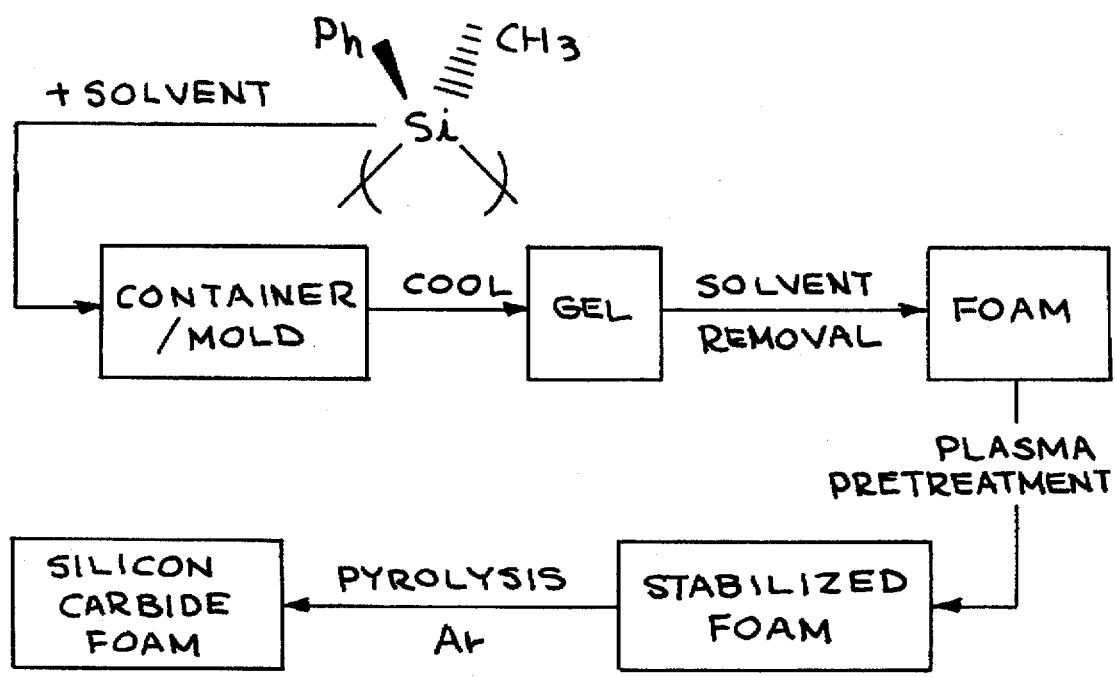
FIG. 1 is a flow diagram showing the steps used in preparing one embodiment of the present invention and their relationship to one another.

The present invention is based, in part, on the discovery that polysilane polymer foams, by proper pretreatment, can be converted into near net shape SiC foams having a surface area of at least 15 m<2>/g and a network of cells having diameters from about 10 to about 100 µm. The term foam as used herein is a material characterized by a three-dimensional interconnecting network of struts generally having open connectivity to all pores. The ability to produce SiC foams having these unique attributes results from controlling the conditions under which gelation takes place, making it possible to control the microstructure of the resulting foam.

Polysilanes, which are organometallic polymers based on a silicon catenate backbone functionalized with organic groups such as methyl and phenyl, are useful as precursor materials for forming SiC. Polysilastyrene is a preferred precursor material. Other precursor organosilicon polymers useful for this process include polydimethylsilane, polyphenylmethylsilane and poly(trimethylsilyl)propyne. A polysilane polymer is first dissolved in an appropriate solvent, preferable cyclohexane. The solution is next cooled unidirectionally to promote gel formation as described in U.S. Pat. No. 4,673,695, incorporated herein by reference. The solvent can then be removed from the gel either by a freeze drying process (sublimation under vacuum) or by supercritical $CO_2$ extraction leaving behind a polysilane foam. However, before the polysilane foam can be pyrolyzed to form a SiC foam, in accordance with the generic equation

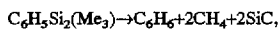

$C_6H_5Si_2(Me_3) \rightarrow C_6H_6 + 2CH_4 + 2SiC,$ it is necessary to stabilize the polysilane foam such that the stabilized polysilane foam is infusible at temperatures below its thermal decomposition temperature. This can be done by means of a plasma treatment process which raises the glass transition temperature (Tg, the temperature at which the foam will melt or flow) of the polysilane foam to a value above the temperature at which the polysilane foam thermally decomposes.

The polysilane polymers used to produce the SiC foams of the present invention have a glass transition temperature (Tg) which is significantly below the temperature at which they thermally decompose, for example, polysilastyrene has a Tg of 100 C while it does not begin to thermally decompose until 400 C. Because Tg defines the temperature at which the polysilane polymer begins to flow, this means that the desired polysilane foam microstructure will not be maintained up to the temperature of thermal decomposition of the polysilane foam unless its Tg has been raised. Various methods of raising the Tg of organosilicon materials have been disclosed. West et al., Ceramic Bull., 62, pp. 899–903 (1983), have demonstrated that photolysis with ultraviolet light will transform polysilastyrene to a more stable, less soluble form indicating crosslinking has taken place. However, because of the small penetration depth of ultraviolet radiation this process will only work effectively for fibers or films. Bartos in U.S. Pat. No. 4,767,831 employs steam or a combination of steam and oxygen to render preceramic silazane polymer powders or fibers infusible a process which is not suitable for raising the Tg of the polysilane foams prepared by the process of the instant invention. Lipowitz in U.S. Pat. No. 4,743,662 discloses a method for pretreating preceramic silazane polymers, in which a gaseous plasma is used to raise Tg. Gases which can be used in this plasma treatment are those in which reactive species are produced thereby inducing formation of stable crosslinks by reaction with the preceramic polymer.

While prior applications of plasma pretreatment to silicon containing polymers have been limited to silazane polymers, we have found that the use of a plasma treatment step, preferably the use of an oxygen plasma treatment step, to be useful to stabilize polysilane polymer gel foams. The polysilane foams are placed in a radio frequency generator for a predetermined length of time depending generally upon the sample thickness, the polymer being treated, the generator power and the type, pressure and flow rate of the gas used. At the conclusion of the plasma treatment step it was found that the polysilane foams could be heated to temperatures in excess of 400 C, at which point the polysilane foams begins to thermally decompose, without melting. Following the plasma pretreatment step the polysilane foams are thermally decomposed to form SiC foams by heating them to temperatures of at least 1000 C in a flowing inert gas atmosphere, preferably nitrogen.

The general process for producing SiC foams disclosed herein is shown in FIG. 1. A polysilane is first dissolved in a solvent, which can be a mixed solvent. The solution can be heated to help dissolve the polysilane. The resulting solution can be poured into a mold whose shape can approximate the desired shaped of the final SiC foam. The mold and its contents are subjected to rapid one-dimensional cooling to temperatures in the range of −10 to +50 C to induce phase separation, thereby forming a gel. Solvent is removed from the gel to form a polysilane foam. The step of solvent removal can be by freeze drying or by supercritical CO2 extraction. The dried foam is stabilized by subjecting it to a plasma treatment step, preferably in oxygen, to raise the glass transition temperature (Tg). Subsequent to the plasma treatment step, the stabilized polysilane foam is pyrolized in an inert atmosphere, preferably argon containing about 5% hydrogen, at about 1000 C to form a SiC foam.

Both isotropic and anisotropic foams can be produced by phase separation processes, in general, and the thermally induced phase separation separation (TIPS) process, in particular. To produce isotropic foams, the polymer and solvent are selected such that the solution spontaneously phase-separates prior to the point at which any component freezes. The structure of the solidified polymer phase determines the structure of the resultant foam, the structure of the polymer phase being retained by cooling the system at a rate sufficient to freeze the polymer, thereby forming a gel, before a change in structure can occur. To produce anisotropic foams, the solution of polymer and solvent are selected such that the solution will not phase separate prior to freezing of the components of the solution. In such a process, the solvent typically freezes before phase separation occurs; the polysilane solute being expelled to the boundaries of the freezing solvent crystals.

The cell size of the foam produced by the process described herein is dependent upon the rate at which the initial solution is cooled. If the rate of cooling is too slow, undesirable nucleation can occur wherein discrete droplets of solvent initially forming will continue to grow in size resulting in a large cell foam. Variations in polymer concentration, solvent, and cooling rate allows control of the macrostructure (greater than 150 nm), pore size, connectivity, and cell architecture of the precursor material.

Whether either an isotropic or anisotropic foam is prepared, it is generally desirable to continue cooling until both the polymer phase as well as the solvent phase have frozen at which point the solvent can be removed by freeze drying (sublimation of the solvent under vacuum). On the other hand, when it is not desirable or not possible to freeze dry the solvent, it can be removed by one or another extraction methods known to those skilled in the art, for example, supercritical $CO_2$ extraction. In either instance, a polymer gel having a continuous, monolithic foam structure remains. The foam that remains after the solvent has been removed from the gel will retain the shape of the container or mold into which the solution had been poured. By allowing for shrinkage of the gel foam during subsequent processing steps and sizing the mold accordingly, it is possible to use the instant invention to produce complex, near net shape SiC parts. Following the solvent removal step, the foams are converted to SiC using a two step process. The first step in this process is to render the organosilane infusible at temperatures below the thermal decomposition temperature of the organosilicone polymer in preparation for the second step in this process, pyrolysis.

When the initial solution of polymer and solvent is prepared it may contain dissolved air or other gases. It is desirable to remove these gases in order to avoid the formation of voids or other defects which would otherwise occur when the dissolved gases come out of solution during freezing. The dissolved gases are preferably removed by degassing the solution by applying a nominal vacuum of about 50 mTorr to the contained solution. However, because it is equally important to prevent vapor condensation and subsequent boiling, the molds containing the polymer solution are vented to atmospheric pressure immediately before the freezing step.

As discussed previously, depending upon the solvent chosen and the manner in which the solution is cooled, either an isotropic or anisotropic foam can be formed. Anisotropic foams can be made by using a solvent in which the polymer does not phase-separate prior to the solvent freezing. When such a solution is subjected to rapid, one dimensional cooling solvent crystals begin to grow rapidly in a direction opposite that from which heat is being extracted. This results in a frozen polymer foam having a directional or anisotropic character. In order to effect one-dimensional cooling it is necessary that the molds containing the polymer solution be properly constructed, as shown, for example, in U.S. Pat. No. 4,832,881, incorporated herein by reference. The bottom portion is constructed from a material which has a good thermal conductivity such as a metal, preferably copper, while the side portions should have a thermal conductivity no greater than that of the polymer solution itself and are constructed from a plastic and preferably Teflon® or plastic coated with Teflon®. To further induce one-dimensional cooling the molds can be placed on a heat sink, preferably a copper block, which is cooled to low temperatures, preferably from about −5 to −10 C.

Figure 8A:
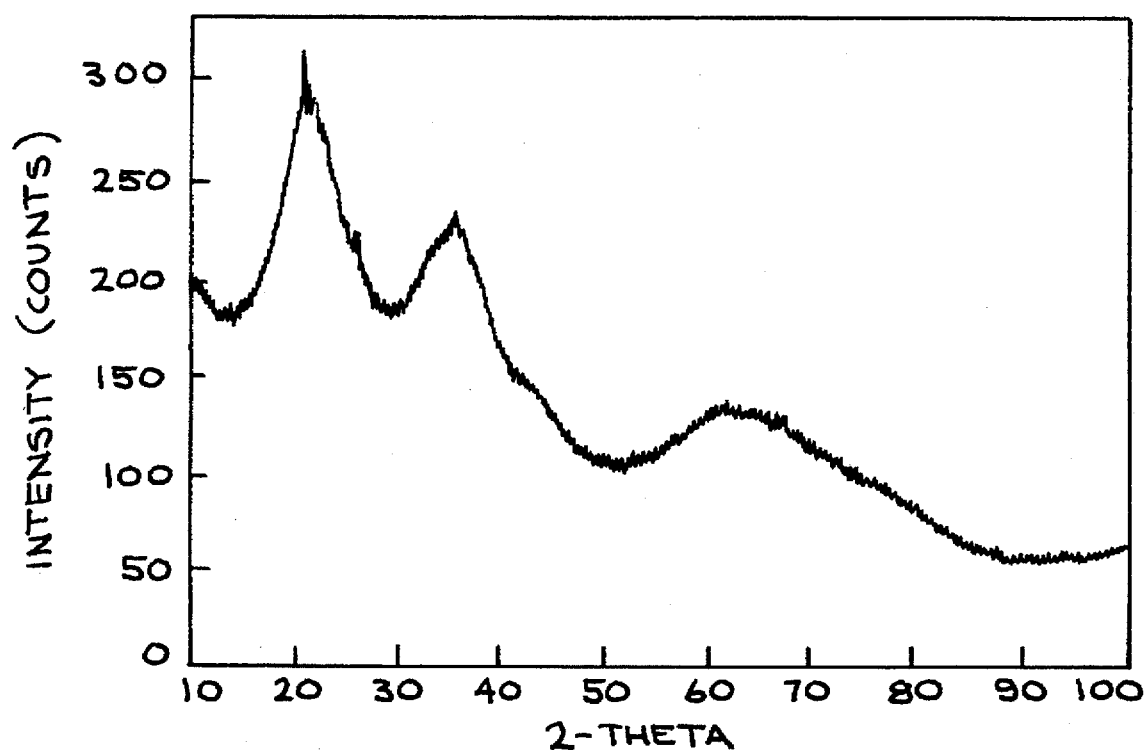
FIGS. 8(a) and 8(b) show the effect of two different plasma pretreatment processes on the $SiO_2$ content of SiC foam produced by the present invention.
Figure 8B:
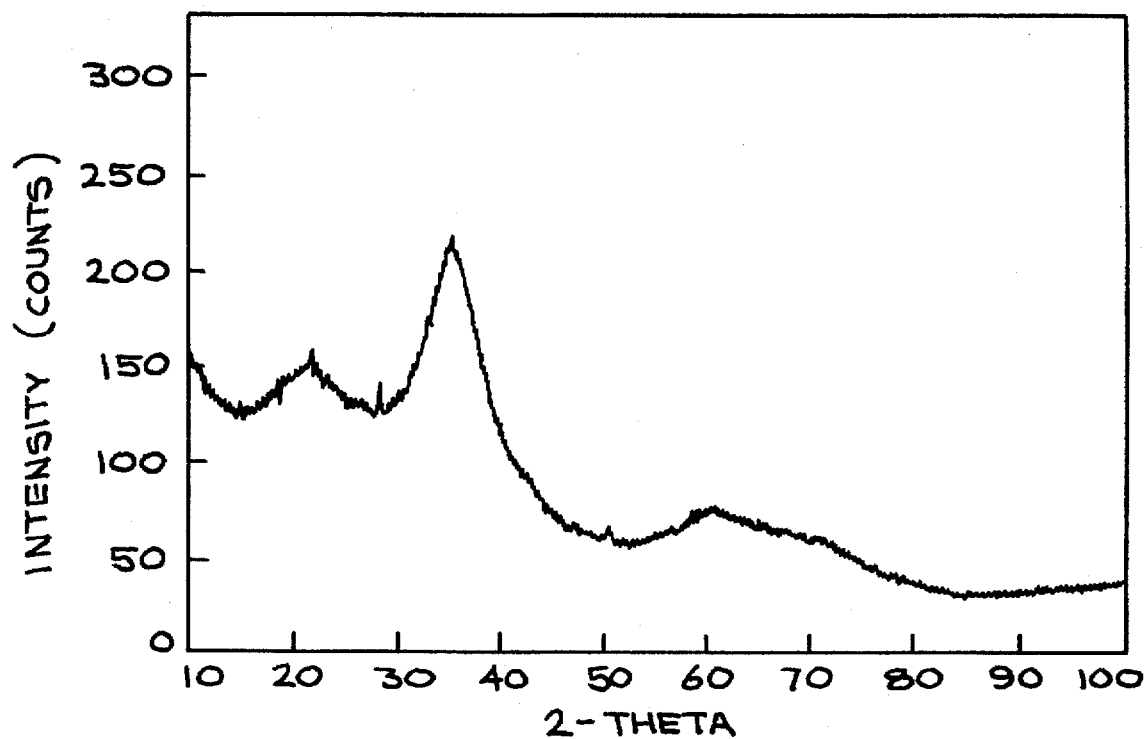

Polysilastyrene has a glass transition temperature (Tg) of ≈100 C and it thermally decomposes, as shown in the equation above, at a temperature of ≈400 C, which means that this material will fuse or melt long before it begins to thermally decompose to form SiC. Thus, any monolithic polysilastyrene foam structure will collapse if any attempt is made to pyrolyze it before it is stabilized. We have found that plasma treatment of the polysilane foam prior to the pyrolysis step to be useful for raising its Tg. Tradeoffs between RF power levels and exposure time are necessary to allow for plasma diffusion throughout the foam without melting from the heat generated by the RF field. In addition, it has been found, as shown in FIG. 8, that as the plasma treatment time is increased the amount of SiO2 present in the SiC foam matrix likewise increases. This is apparent in the increase in the SiO2 peak at $2\upsilon=22°$ as the plasma processing time is increased from 2 hours at 50 Watts, curve (a) to 22 hours at 50 Watts, curve (b). In the present invention, an oxygen plasma is the preferred means of stabilizing a polysilastyrene foam structure at temperatures equal to or below the temperature at which the sample thermally decomposes to form SiC. The oxygen plasma stabilized polysilane foams were pyrolyzed in an $N_2$ atmosphere at 1000° C. Higher temperatures can be used to increase crystallinity and strength of the porous ceramic.

While gelation methods common to the polymer art can be used to fabricate organosilicon polymers, generally, thermally induced phase separation (TIPS) is preferably used to prepare the precursor SiC foams. The following examples illustrate some of many possible procedures for preparing the inventive SiC foams as well as the effect various production variables on the resulting foam microstructure.

EXAMPLE 1

A 5 weight percent solution of polysilastyrene (PSS), a poly (50% dimethylsilyl)(50% phenylmethyl silane) copolymer (Gelest, Inc.), in cyclohexane was prepared and poured into a mold. The mold (45×133×30 mm) had Teflon® coated plastic sides and a detachable copper plate on the bottom (facilitated by rubber gaskets on the mold edges). In order to eliminate bubble formation in the final product it was necessary to remove any residual gasses from the gel. A top, fitted with a septum, was used to evacuate the sample. To prevent headspace vapor cloud condensation and subsequent boiling, the molds were vented to atmospheric pressure as cooling begins. The assembly was placed on a massive copper block, acting as a heat sink, which was previously cooled to about −5° to −10° C. A small amount of petroleum ether was used as a heat transfer fluid between the mold bottom and the cooling plate. A lead brick was placed on top of the assembly to ensure good contact between the copper plates. The temperature of the copper heat sink was maintained within 2° C. of the initial temperature. The solvent solidification front proceeded from the bottom to the top in approximately 2 hours. The assembly was removed from the cold plate and the mold fully or partially disassembled. The solidified sample was immediately transferred into a Vertis® freeze dryer previously cooled to −5° C. After one day at −5° C., the temperature was slowly increased over the next 8 hours to +5° C. The sample was removed after a total of two days in the freeze dryer. The polysilane foams shrunk approximately 5% in each linear direction during the freeze drying procedure.

Figure 2:
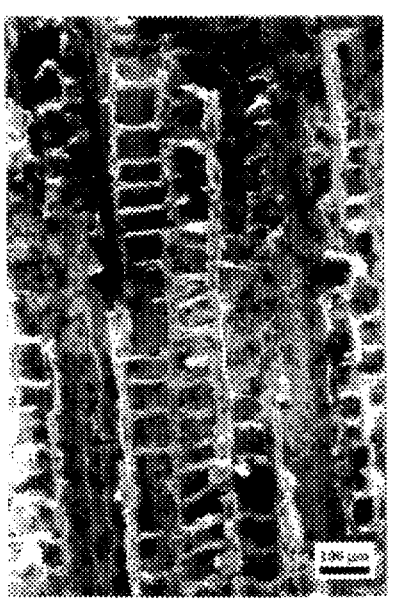
FIG. 2 is a scanning electron micrograph of the internal structure of a polysilastyrene (PSS) foam produced from a 5% solution of PSS and cyclohexane.

The Scanning Electron Microscope (SEM) micrograph shown in FIG. 2 is of a PSS foam produced from a 5 weight percent cyclohexane solution. The resulting PSS foam has an alignment of honeycomb-like channels parallel to the direction of solidification. The channels are approximately 60 µm in width and continue vertically most of the way through the sample (15 mm). These channels are consistent with a liquid-liquid phase separation process experiencing a unidirectional solidification gradient. The wall thickness is approximately 10 µm. Each channel has repeating partitions, perpendicular to the solidification direction, and spaced approximately 40 µm apart. The mesoporosity (between 1.5 and 150 nm) within the channel walls, is trabecular in appearance. This mesoporosity could be due to the bimodal molecular weight distribution, with the more soluble and mobile lower molecular weight fraction phase separating later than the higher molecular weight fraction.

The polysilane foams, prepared as described above, were placed in an radio frequency (RF) generated oxygen plasma for one hour. Operating conditions for the plasma stabilization step will vary as a function of the foam density and the type of generator used. However, for the polysilane foams prepared as described above, the preferred conditions for this process were: 2 hours at 50 Watts and 2 hours at 100 Watts at a 1 Torr chamber pressure and 10 sccm of oxygen using a LFE Corp. model PUC-301 plasma generator. A small amount of shrinkage of the sample was observed (approximately 10-20% in the linear dimensions) upon completion of the cycle. The melting point, or glass transition temperature, of this stabilized foam is greater than 400 C, approximately 300 C higher than the starting material.

Figure 7:
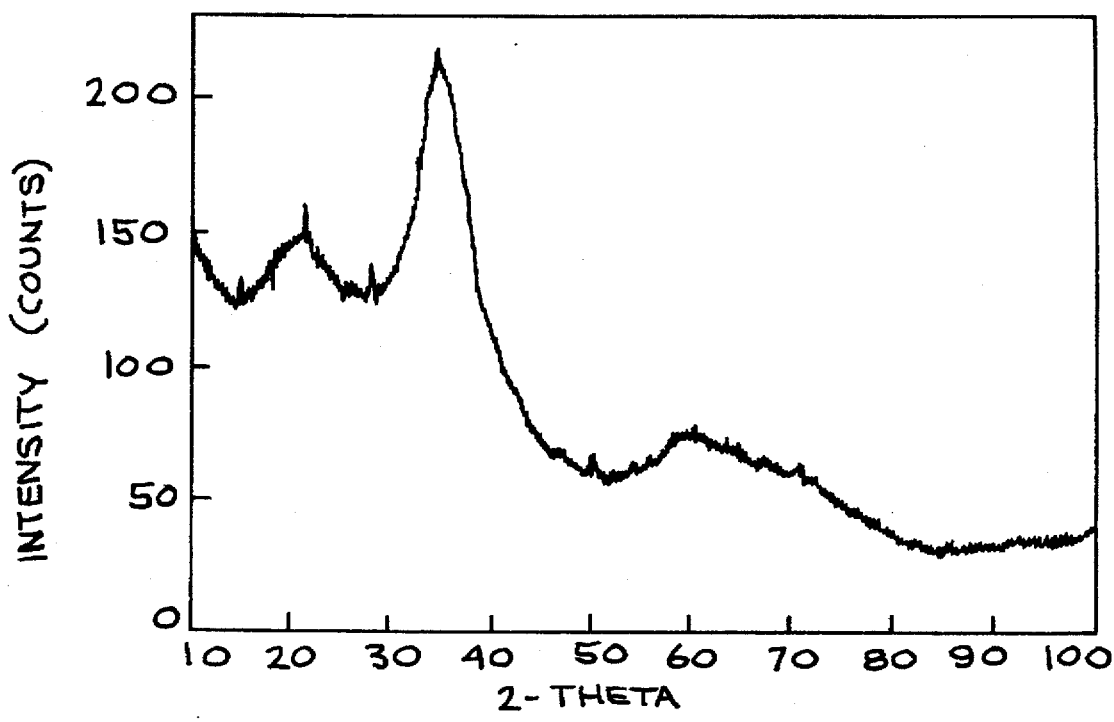
FIG. 7 shows an x-ray diffraction scan of the SiC foam of FIG. 6.
Figure 5:
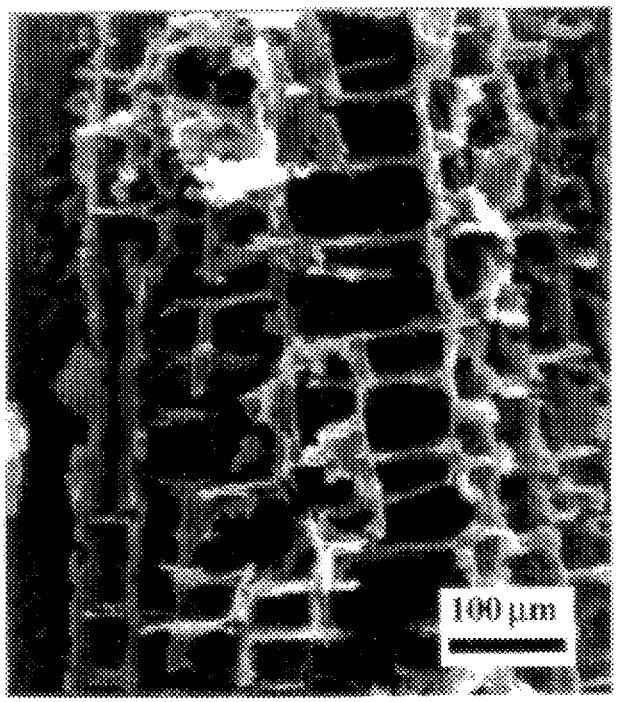
FIG. 5 is a scanning electron micrograph of the internal structure of the polysilastyrene (PSS) foam of FIG. 1 following oxygen plasma pretreatment.
Figure 6:
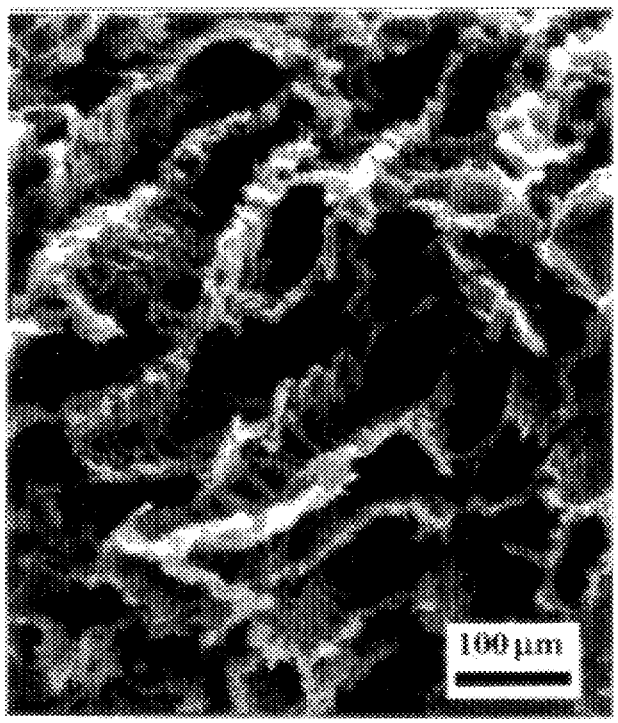
FIG. 6 is a scanning electron micrograph of the internal structure of the SiC foam produced by pyrolysis of the (PSS) foam of FIG. 5 at 1000 C.

The stabilized foam was pyrolized in a tube furnace at 1000 C and that temperature was maintained for approximately 6 hours in a flowing inert gas atmosphere (2 l/min), an atmosphere of argon or argon containing 5% H2 is preferred. The stabilized foam which was removed from the cooled furnace had lost 75% of its initial weight. FIG. 5 shows the structure of the stabilized PSS foam subsequent to the plasma treatment step. It can be seen that the stabilized foam has retained its original structure. FIG. 6 shows the macrostructure from the PSS foam has been retained in the SiC foam after pyrolysis. X-ray diffraction analysis of the product, shown in FIG. 7, indicates it to be composed of SiC and a small amount of SiO2 in the ration of SiC:SiO2 of 4:1. It has been determined that the presence of SiO2 is due to the plasma treatment process. The surface area of the SiC foam was determined to be ≈15 m$<2>$/g. As shown in FIG. 8, increasing the plasma treatment time can significantly increase the amount of SiO2 present in the SiC matrix. This is apparent in the increase in the SiO2 peak at 22° as the plasma processing time is increased from 2 hours at 50 Watts in FIG. 8($a$) to 22 hours at 50 Watts in FIG. 8($b$). It is suggested that the presence of SiO2 in the SiC foam is due to reaction between the polysilane foam matrix and oxygen radicals formed during the treatment process.

EXAMPLE 2

Figure 3:
FIG. 3 is a scanning electron micrograph of the internal structure of a polysilastyrene (PSS) foam produced from a 1% solution of PSS and cyclohexane.

The effect of polymer concentration in the original solution on the resulting SiC foam structure is illustrated in this example. A polysilastyrene (PSS) foam was prepared from a 1 weight percent PSS in cyclohexane solution, exactly as described in Example 1. The PSS foams produced from a solution of 5 weight percent PSS in cyclohexane are moderately robust, while the foams produced from a solution of 1 weight percent PSS in cyclohexane barely support their own weight. The SEM micrograph of the 1 weight percent foam shown in FIG. 3 has a more fibrillar macrostructure with a similar trabecular microstructure within the channel walls. The 1 weight percent foams still undergo the familiar liquid-liquid phase separation to form the channel walls. However, the concentration of polymer has been diminished to the point where there is insufficient material to form a completely solid wall.

EXAMPLE 3

Figure 4:
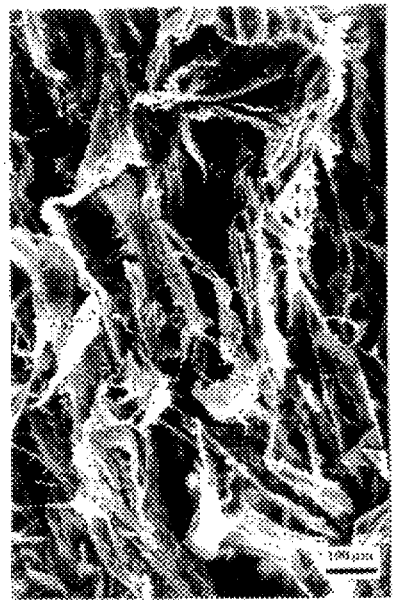
FIG. 4 is a scanning electron micrograph of the internal structure of a polysilastyrene (PSS) foam produced from a 5% solution of PSS and benzene.

This example illustrates the effect that the solvent plays on the microstructure of the resulting foam. A polysilastyrene foam was prepared in exactly same manner as set forth in Example 1 except that the solvent was benzene. FIG. 4 is a SEM micrograph of the microstructure of a PSS foam produced from a benzene solution. The structure is less regular than that obtained from a cyclohexane solution. Because PSS is more soluble in benzene than cyclohexane, liquid-liquid phase separation takes place later in the cooling process, i.e., when the solution temperature is lower. The polymer chains being less mobile they cannot form the regular structures obtained from the cyclohexane solution of PSS, cf., FIG. 2.

EXAMPLE 4

In this example the effect of cooling rate on the structure of the foam was examined by comparing the foam produced by a 40° C. solution of PSS in a 40° C. mold placed on a heat sink at −100° C. with the foam produced by a solution started at room temperature and cooled to −5° C. The solutions were prepared in exactly same manner as set forth in Example 1. The rate of freezing was approximately 3 or 4 times slower for the samples with the smaller temperature change. The solidification rate is controlled largely by the fact that the thermal conductivity of the organic solution is greater than that of the frozen polymer/solvent mixture. Two different microstructures are observed where the rate is faster the foam microstructure has narrower, less continuous channels. The microstructure, where the cooling rate is slower and the solvent solidification occurred much later in time, has partitions present in the columns. The walls of the columns are observed to be thicker with a slower cooling rate. These observations would be consistent with greater diffusion lengths allowing the polymer to migrate toward the walls of the channels and resulting in larger void spaces.

The inventors have found that solvents such as benzene, dioxane, benzene/methanol mixtures are useful for preparing organosilicon polymer foams. The preferred solvent being cyclohexane. These solvents must be removed by freeze drying. The solvents napthalene, para-dichlorobenze and difluorotetrachloroethane are also useful; these solvents being removed by super critical CO2 extraction.

These foregoing examples are for illustrative purposes are should not be construed to restrict or limit the invention disclosed herein in any way. Various modifications may occur to those skilled in the art without departing from the scope of the invention as defined by the appended claims.

We claim:

1. A method of preparing monolithic SiC foams, comprising steps of:
   a) dissolving an organosilicon polymer or copolymer in a solvent to form a solution;
   b) cooling the solution to form a gel;
   c) removing the solvent from the gel to form a polymer foam;
   d) stabilizing the polymer foam by subjecting the foam to a plasma; and
   e) pyrolyzing the stabilized foam in an inert gas at a temperature sufficient to decompose the stabilized polymer foam and thereby form a SiC foam.

2. The method of claim 1, wherein the organosilicon polymer or copolymer is selected from a group consisting of polysilastyrene, polydimethylsilane, polyphenylmethylsilane and poly(trimethylsilyl)propyne and combinations thereof.

3. The method of claim 1, wherein the solvent is selected from a group consisting of cyclohexane, benzene, ethanol, dioxane, napthalene, para-dichlorobenzene and difluorotetrachloroethane and combinations thereof.

4. The method of claim 1, wherein the concentration of organosilicon polymer in the solution is at least about 5% by weight.

5. The method of claim 1, wherein dissolved gases are removed from the solution by subjecting the solution to a pressure of less than about 50 mTorr prior to the step of cooling.

6. The method of claim 1, wherein the solvent is removed by vacuum sublimation or supercritical $CO_2$ extraction.

7. The method of claim 1 wherein said step of stabilizing comprises subjecting the polymer foam to an oxygen containing plasma.

8. The method of claim 7, wherein the oxygen plasma generator is produced at power level of about 50 Watts for about 2 hours and then about 100 Watts for about 2 hours at a chamber pressure of about 1 Torr and wherein the oxygen flow rate is about 10 sccm.

9. The method of claim 1, wherein the stabilized polymer foam is heated to a temperature of about 1000 C for about 6 hours in an inert gas.

10. The method of claim 9, wherein the inert gas is nitrogen, argon or argon containing about 5% hydrogen.

11. The method of claim 1 further including:

a) cooling the solution thereby inducing phase separation and continuing to cool the solution until the solvent freezes; and b) removing the solvent by vacuum sublimation.

12. The method of claim 1 further including:

a) cooling the solution at a rate sufficient to cause the solvent to freeze prior to phase separation; and b) removing the solvent.

13. The method of claim 1 wherein said step of cooling comprises cooling in a one-dimensional fashion.

14. The method of claim 1, wherein the step of stabilizing includes increasing the glass transition temperature ($T_G$) such that $T_G$ is greater than the temperature at which the stabilized foam is pyrolized.

15. A SiC foam prepared by the method of claim 1.

16. A monolithic SiC foam structure, having a surface area of about 15 $m^2/g$ comprising a network of cells having diameters in the range of about 10 to about 100 µm within said structure, wherein the cells have walls containing pores in the range of about 1 to 150 nm, prepared by the method of claim 1.

17. A near net shape SiC foam prepared by method of claim 1.

* * * * *